United States Patent
Merker et al.

(10) Patent No.: US 7,377,947 B2
(45) Date of Patent: May 27, 2008

(54) ELECTROLYTE CAPACITORS HAVING A POLYMERIC OUTER LAYER AND PROCESS FOR THEIR PRODUCTION

(75) Inventors: Udo Merker, Köln (DE); Klaus Wussow, Netphen (DE); Friedrich Jonas, Aachen (DE)

(73) Assignee: H.C. Starck GmbH (DE)

( * ) Notice: Subject to any disclaimer, the term of this patent is extended or adjusted under 35 U.S.C. 154(b) by 232 days.

(21) Appl. No.: 11/401,121

(22) Filed: Apr. 10, 2006

(65) Prior Publication Data

US 2006/0236531 A1 Oct. 26, 2006

(30) Foreign Application Priority Data

Apr. 11, 2005 (DE) .................. 10 2005 016 727

(51) Int. Cl.
*H01G 9/00* (2006.01)

(52) U.S. Cl. .............. 29/25.03; 361/523; 361/524; 361/525; 361/528; 361/529; 361/530; 361/531; 361/532; 257/E21.008

(58) Field of Classification Search ............ None
See application file for complete search history.

(56) References Cited

U.S. PATENT DOCUMENTS

| | | | |
|---|---|---|---|
| 4,910,645 A | 3/1990 | Jonas et al. | |
| 5,300,575 A | 4/1994 | Jonas et al. | |
| 5,972,052 A | 10/1999 | Kobayashi et al. | |
| 6,001,281 A | 12/1999 | Lessner et al. | |
| 6,602,741 B1 | 8/2003 | Kudoh et al. | |
| 6,987,663 B2* | 1/2006 | Merker et al. ........... | 361/523 |
| 2004/0190227 A1 | 9/2004 | Takatani et al. | |

FOREIGN PATENT DOCUMENTS

| | | |
|---|---|---|
| EP | 0 340 512 | 11/1989 |
| EP | 0 440 957 | 8/1991 |
| EP | 0 825 626 | 2/1998 |
| JP | 11121281 | 4/1999 |
| JP | 2001-060535 | 3/2001 |
| JP | 2001-102255 | 4/2001 |
| JP | 2002025862 | 1/2002 |
| JP | 2003-188052 | 7/2003 |
| JP | 2003229330 | 8/2003 |

* cited by examiner

*Primary Examiner*—Michael S. Lebentritt
*Assistant Examiner*—Kyoung Lee
(74) *Attorney, Agent, or Firm*—Connolly Bove Lodge & Hutz LLP

(57) ABSTRACT

The invention relates to a process for the production of electrolyte capacitors having a low equivalent series resistance and low residual current, and which comprise a solid electrolyte of conductive polymers and an outer layer comprising conductive polymers applied in the form of a dispersion. Electrolyte capacitors produced by this process and the use of such electrolyte capacitors are also provided.

23 Claims, 2 Drawing Sheets

ELECTROLYTE CAPACITORS HAVING A POLYMERIC OUTER LAYER AND PROCESS FOR THEIR PRODUCTION

CROSS-REFERENCE TO RELATED APPLICATION

This application claims priority under 35 U.S.C.§119(a-e) to German application DE 10 2005 016727, filed Apr. 11, 2005.

FIELD OF THE INVENTION

The invention relates to a process for the production of electrolyte capacitors having a low equivalent series resistance and low residual current, which comprise a solid electrolyte of conductive polymers and an outer layer comprising conductive polymers, electrolyte capacitors produced by this process and the use of such electrolyte capacitors.

BACKGROUND OF THE INVENTION

A commercially available solid electrolyte capacitor as a rule comprises a porous metal electrode, an oxide layer on the metal surface, an electrically conductive solid which is incorporated into the porous structure, an outer electrode (contacting), such as e.g. a silver layer, and further electrical contacts and an encapsulation.

Examples of solid electrolyte capacitors are tantalum, aluminium, niobium and niobium oxide capacitors with charge transfer complexes, or pyrolusite or polymer solid electrolytes. The use of porous bodies has the advantage that because of the high surface area a very high capacitance density, i.e. a high electrical capacitance over a small space, can be achieved.

π-Conjugated polymers are particularly suitable as solid electrolytes because of their high electrical conductivity. π-Conjugated polymers are also called conductive polymers or synthetic metals. They are increasingly gaining economic importance, since polymers have advantages over metals in respect of processability, weight and targeted adjustment of properties by chemical modification. Examples of known π-conjugated polymers are polypyrroles, polythiophenes, polyanilines, polyacetylenes, polyphenylenes and poly(p-phenylene-vinylenes), a particularly important polythiophene which is used industrially being poly-3,4-(ethylene-1,2-dioxy)thiophene, often also called poly(3,4-ethylenedioxytliophene), since it has a very high conductivity in its oxidized form.

Technical development in electronics increasingly requires solid electrolyte capacitors having very low equivalent series resistances (ESR). Reasons for this are, for example, falling logic voltages, a higher integration density and increasing cycle frequencies in integrated circuits. Furthermore, a low ESR also lowers energy consumption, which is particularly advantageous for mobile battery-operated uses. There is therefore the desire to reduce the ESR of solid electrolyte capacitors to as low a value as possible.

European Patent Specification EP-A-340 512 describes the preparation of a solid electrolyte from 3,4-ethylene-1,2-dioxythiophene and the use of its cationic polymer, prepared by oxidative polymerization, as a solid electrolyte in electrolyte capacitors. Poly(3,4-ethylenedioxythiophene), as a substitute for manganese dioxide or charge transfer complexes in solid electrolyte capacitors, lowers the equivalent series resistance of the capacitor due to the higher electrical conductivity, and improves the frequency properties.

In addition to a low ESR, modern solid electrolyte capacitors require a low residual current and a good stability towards external stresses. During the production process in particular, high mechanical stresses arise during the encapsulation of the capacitor anodes, which can greatly increase the residual current of the capacitor anode.

Stability towards such stresses and therefore a low residual current can be achieved above all by an approx. 5-50 µm thick outer layer of conductive polymers on the capacitor anode. Such a layer serves as a mechanical buffer between the capacitor anode and the contacting on the cathode side. This prevents e.g. the silver layer (contacting) from coming into direct contact with the dielectric or damaging this under mechanical stress, and the residual current of the capacitor from increasing as a result. The conductive polymeric outer layer itself should have so-called self-healing properties: relatively minor defects in the dielectric on the outer anode surface which arise in spite of the buffer action are electrically insulated in that the conductivity of the outer layer at the defect is destroyed by the electric current.

The formation of a thick polymeric outer layer by means of an in situ polymerization is very difficult. In this context, the layer formation requires very many coating cycles. Due to the high number of coating cycles, the outer layer becomes very inhomogeneous, in particular the edges of the capacitor anode are often inadequately covered. Japanese Patent Application JP-A 2003-188052 reports that a homogeneous covering of the edges requires expensive coordination of the process parameters. However, this makes the production process very susceptible to malfunctions. An addition of binder materials for faster building up of layers is also difficult, since the binder materials impede the oxidative in situ polymerization. Furthermore, the layer polymerized in situ as a rule has to be freed from residual salts by washing, as a result of which holes arise in the polymer layer.

A dense electrically conductive outer layer with good covering of the edges can be achieved by electrochemical polymerization. However, electrochemical polymerization requires initial deposition of a conductive film on the insulating oxide layer of the capacitor anode and then electrical contacting of this layer for each individual capacitor. This contacting is very expensive in mass production and can damage the oxide layer.

The use of formulations which comprise the powder of a conductive polymer and binder have, because of high contact resistances between the individual powder particles, too high an electrical resistance to render possible production of solid electrolyte capacitors having a low ESR.

In Japanese Patent Applications JP-A 2001-102255 and JP-A 2001-060535, a layer of polyethylenedioxythiophene/polystyrenesulfonic acid (PEDT/PSS), also called polyethylenedioxythiophene/polystyrenesulfonic acid complex or PEDT/PSS complex, is applied directly to the oxide film for protection of the oxide film and better adhesion of the solid electrolyte to the oxide film. The outer layer is then applied to this layer by means of in situ polymerization or by impregnation of the capacitor anode with tetracyanoquinodimethane salt solution. However, this method has the disadvantage that the PEDT/PSS complex does not penetrate into porous anode bodies having small pores. As a result, modern, highly porous anode materials cannot be used.

U.S. Pat. No. 6,001,281 describes, in the examples, capacitors having a solid electrolyte of polyethylenedioxythiophene (PEDT) prepared in situ and an outer layer of PEDT/PSS complex. A disadvantage of these capacitors, however, is that they have a high ESR of 130 mΩ and higher.

In the not yet published German Patent Application DE-A-10349112, a polymeric outer layer is produced by application of a dispersion comprising at least one polymeric anion and at least one optionally substituted polyaniline and/or at least one polythiophene having recurring units of the general formula (I), (II) or recurring units of the general formula (I) and (II)

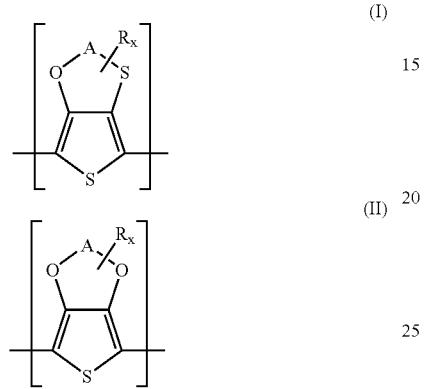

and a binder. Although the covering of the edges can be improved by this process, dense polymeric outer layers cannot be reproduced reliably, however, by this means.

There therefore continues to be a need for an improved process for the production of solid electrolyte capacitors having a low equivalent series resistance (ESR), with which a dense polymeric outer layer can be realized simply and reliably reproduced with good covering of the edges. The object was therefore to provide such a process and the capacitors improved by this means.

SUMMARY OF THE INVENTION

It has now been found, surprisingly, that dispersions comprising particles of a conductive polyaniline and/or, in particular, polythiophene having an average particle diameter in the range of 70-500 nm and a binder meet these requirements.

The diameter distribution of the particles b) comprising a conductive polymer in dispersions surprisingly has a considerable influence on the formation of outer layers on electrolyte capacitors. In particular, the edges and corners of the capacitor body cannot be covered with a closed polymer film with dispersions comprising predominantly particles b) having an average diameter of less than 70 nm. The targeted adjustment of the particle diameter distribution in the dispersions thus makes it possible reliably to achieve a good covering of corners and edges.

The present invention therefore provides a process for the production of an electrolyte capacitor, in which, on to a capacitor body at least comprising a porous electrode body of an electrode material, a dielectric, which covers the surface of the electrode material, a solid electrolyte at least comprising an electrically conductive material, preferably a conductive polymer, which completely or partly covers the dielectric surface, is applied a dispersion a) which at least comprises particles b) of an electrically conductive polymer which comprise at least one optionally substituted polyaniline and/or at least one polythiophene having recurring units of the general formula (I) or of the formula (II) or recurring units of the general formulae (I) and (II)

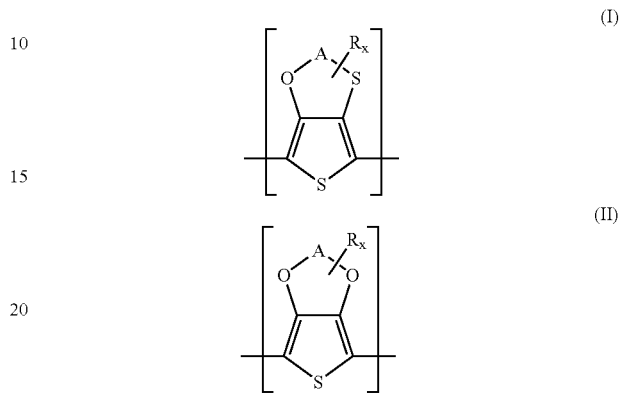

wherein

A represents an optionally substituted $C_1$-$C_5$-alkylene radical,

R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical, x represents an integer from 0 to 8 and in the case where several radicals R are bonded to A, these can be identical or different, and a binder c) and a dispersing agent d), and, for formation of an electrically conductive polymeric outer layer, the dispersing agent d) is at least partly removed and/or the binder c) is cured, characterized in that the particles b) of the conductive polymer in the dispersion a) have an average diameter of 70-500 nm. The general formulae (1) and (II) are to be understood as meaning that x substituents R can be bonded to the alkylene radical A.

BRIEF DESCRIPTION OF THE DRAWINGS

The invention is further illustrated by the following non-limiting drawings in which.

DETAILED DESCRIPTION OF PREFERRED EMBODIMENTS

Figure 1:
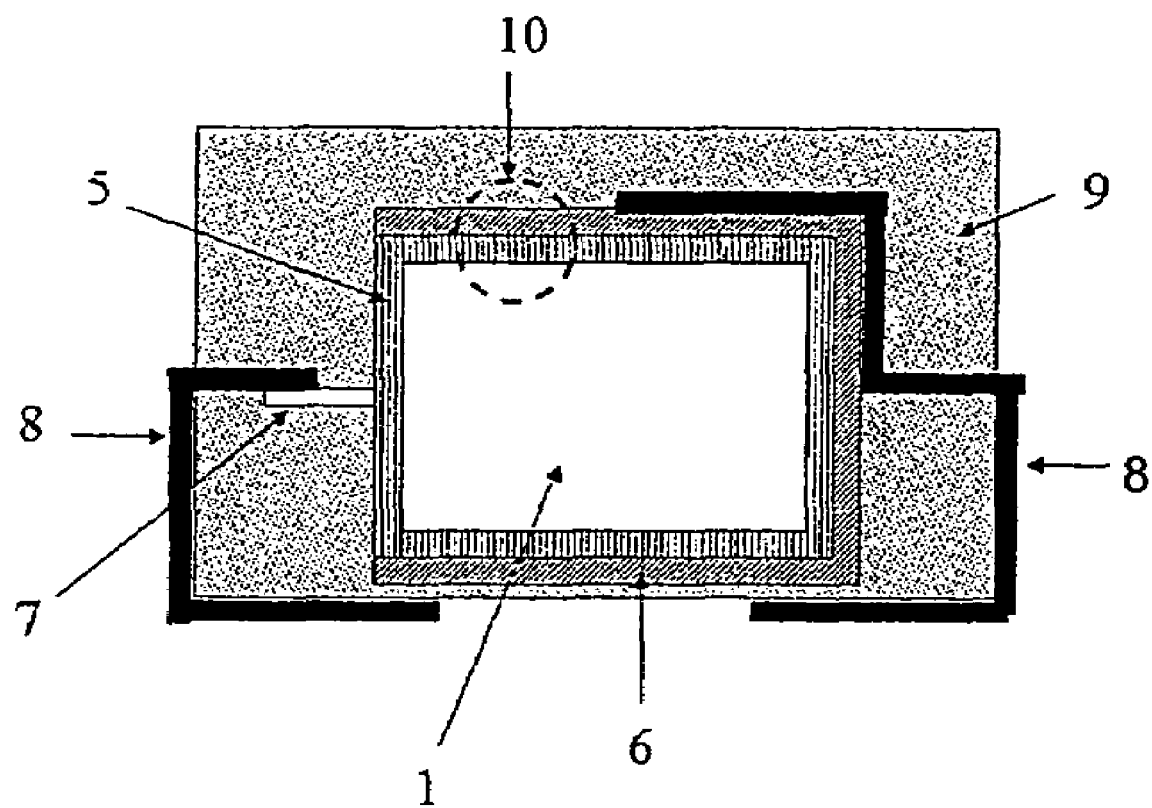
FIG. 1 is a diagrammatic representation of the construction of a solid electrolyte capacitor.

As used herein in the specification and claims, including as used in the examples and unless otherwise expressly specified, all numbers may be read as if prefaced by the word "about", even if the term does not expressly appear. Also, any numerical range recited herein is intended to include all sub-ranges subsumed therein.

The diameter of the particles b) of the conductive polymer relates to a weight distribution of the particles b) in the dispersion a) as a function of the particle diameter. It is determined, for example, via an ultracentrifuge measurement.

In the process according to the invention, the particles b) of the conductive polymer in the dispersion a) preferably have an average diameter of 90-400 nm, particularly preferably 100-300 nm.

Preferably, the diameter distribution of the particles b) of the conductive polymer in the dispersion a) has a $d_{10}$ value of greater than 50 nm and a $d_{90}$ value of less than 600 nm, particularly preferably a $d_{10}$ value of greater than 70 nm and a $d_{90}$ value of less than 500 nm, very particularly preferably a $d_{10}$ value of greater than 80 nm and a $d_{90}$ value of less than 400 nm.

In this context, the $d_{10}$ value of the diameter distribution states that 10% of the total weight of all the particles b) of the conductive polymer in the dispersion a) can be assigned to those particles b) which have a diameter of less than or equal to the $d_{10}$ value. The $d_{90}$ value of the diameter distribution states that 90% of the total weight of all the particles b) of the conductive polymer in the dispersion a) can be assigned to those particles b) which have a diameter of less than or equal to the $d_{90}$ value.

In the electrolyte capacitor produced by the process according to the invention, the electrode material forms a porous body having a high surface area and is e.g. in the form of a porous sintered body or a roughened film. In the following, this porous body is also called the electrode body for short.

The electrode body covered with a dielectric is also called the oxidized electrode body for short in the following. The term "oxidized electrode body" also includes those electrode bodies which are covered with a dielectric which has not been prepared by oxidation of the electrode body.

The electrode body covered with a dielectric and completely or partly with a solid electrolyte is also called the capacitor body for short in the following.

The electrically conductive layer which is prepared by the process according to the invention from the dispersion a) and which comprises at least one optionally substituted polyaniline and/or at least one polythiophene having recurring units of the general formula (I) or of the formula (II) or recurring units of the general formula (I) and (II) and at least one binder c) is called the polymeric outer layer here.

Preferably, the dispersion a) comprises at least one polymeric, organic binder c). Possible particularly preferred polymeric, organic binders c) are, for example, polyvinyl alcohols, polyvinylpyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine/formaldehyde resins, epoxy resins, silicone resins or celluloses. Preferred possible polymeric organic binders c) are furthermore also those which are produced by addition of crosslinking agents, such as, for example, melamine compounds, masked isocyanates or functional silanes, such as e.g. 3-glycidoxypropyltrialkoxysilane, tetraethoxysilane and tetraethoxysilane hydrolysate, or crosslinkable polymers, such as e.g. polyurethanes, polyacrylates or polyolefins, and subsequent crosslinking. Such crosslinking products which are suitable as polymeric binders c) can also be formed, for example, by reaction of the crosslinking agent added with polymeric anions optionally contained in the dispersion a). Preferred binders c) are those which have an adequate heat stability in order to withstand the temperatures to which the finished capacitors are later exposed, e.g. soldering temperatures of from 220 to 260° C.

The solids content of the polymeric binder c) in the dispersion a) is 0.1-90 wt. %, preferably 0.5-30 wt. % and very particularly preferably 0.5-10 wt. %.

The dispersions a) can comprise one or more dispersing agents d). The following solvents may be mentioned as dispersing agents d) by way of example: aliphatic alcohols, such as methanol, ethanol, i-propanol and butanol; aliphatic ketones, such as acetone and methyl ethyl ketone; aliphatic carboxylic acid esters, such as ethyl acetate and butyl acetate; aromatic hydrocarbons, such as toluene and xylene; aliphatic hydrocarbons, such as hexane, heptane and cyclohexane; chlorohydrocarbons, such as methylene chloride and dichloroethane; aliphatic nitriles, such as acetonitrile; aliphatic sulfoxides and sulfones, such as dimethylsulfoxide and sulfolane; aliphatic carboxylic acid amides, such as methylacetamide, dimethylacetamide and dimethylformamide; and aliphatic and aralipatic ethers, such as diethyl ether and anisole. Water or a mixture of water with the abovementioned organic solvents can furthermore also be used as the dispersing agent d).

Preferred dispersing agents d) are water or other protic solvents, such as alcohols, e.g. methanol, ethanol, i-propanol and butanol, and mixtures of water with these alcohols, water being the particularly preferred solvent.

Where appropriate, the binder c) can also function as the dispersing agent d).

In the context of the invention, the term polymer includes all compounds having more than one identical or different recurring unit.

Conductive polymers are understood as meaning here in particular the compound class of π-conjugated polymers which have an electrical conductivity after oxidation or reduction. Preferably, conductive polymers are understood as meaning those π-conjugated polymers which have an electrical conductivity of the order of at least 1 µS cm$^{-1}$ after oxidation.

In the context of the invention, the prefix poly- is to be understood as meaning that more than one identical or different recurring unit is contained in the polymer or polythiophene. The polythiophenes contain a total of n recurring units of the general formula (I) or formula (II) or of the general formulae (I) and (II), wherein n is an integer from 2 to 2,000, preferably 2 to 100. The recurring units of the general formula (I) and/or (II) can in each case be identical or different within a polythiophene. Polythiophenes having in each case identical recurring units of the general formula(e) (I), (II) or (I) and (II) are preferred.

The polythiophenes preferably in each case carry H on the end groups.

The solid electrolyte can comprise as conductive polymers optionally substituted polythiophenes, optionally substituted polypyrroles or optionally substituted polyanilines.

Preferred conductive polymers for the solid electrolyte are polythiophenes having recurring units of the general formula (I), (II) or recurring units of the general formula (I) and (II), wherein A, R and x have the meaning given above for the general formulae (I) and (II).

Polythiophenes having recurring units of the general formula (I), (II) or recurring units of the general formula (I)

and (II) wherein A represents an optionally substituted $C_2$-$C_3$-alkylene radical and x represents 0 or 1 are particularly preferred.

Poly(3,4-ethylenedioxythiophene) is very particularly preferred as the conductive polymer of the solid electrolyte.

$C_1$-$C_5$-Alkylene radicals are preferably methylene, ethylene, n-propylene, n-butylene or n-pentylene. $C_1$-$C_{18}$-Alkyl R preferably represent linear or branched $C_1$-$C_{18}$-alkyl radicals, such as methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl radicals R represent, for example, cyclopentyl, cyclohexyl, cycloheptyl, cyclooctyl, cyclononyl or cyclodecyl, $C_5$-$C_{14}$-aryl radicals R represent, for example, phenyl or naphthyl, and $C_7$-$C_{18}$-aralkyl radicals R represent, for example, benzyl, o-, m-, p-tolyl, 2,3-, 2,4-, 2,5-, 2,6-, 3,4-, 3,5-xylyl or mesityl. The above list serves to illustrate the invention by way of example and is not to be considered as conclusive.

Possible optionally further substituents of the radicals A and/or of the radicals R are numerous organic groups, for example alkyl, cycloalkyl, aryl, aralkyl, alkoxy, halogen, ether, thioether, disulfide, sulfoxide, sulfone, sulfonate, amino, aldehyde, keto, carboxylic acid ester, carboxylic acid, carbonate, carboxylate, cyano, alkylsilane and alkoxysilane groups as well as carboxamide groups.

Possible substituents for polyaniline are, for example, the radicals A and R listed above and/or the further substituents of the radicals A and R. Unsubstituted polyanilines are preferred.

The polythiophenes employed as the solid electrolyte in the preferred process can be neutral or cationic. In preferred embodiments they are cationic, "cationic" relating only to the charges which sit on the polythiophene main chain. Depending on the substituent on the radicals R, the polythiophenes can carry positive and negative charges in the structural unit, the positive charges being on the polythiophene main chain and the negative charges optionally being on the radicals R substituted by sulfonate or carboxylate groups. In this context, the positive charges of the polythiophene main chain can be partly or completely satisfied by the anionic groups optionally present on the radicals R. Viewed overall, the polythiophenes can be cationic, neutral or even anionic in these cases. Nevertheless, in the context of the invention they are all regarded as cationic polythiophenes, since the positive charges on the polythiophene main chain are decisive. The positive charges are not shown in the formulae, since their precise number and position cannot be determined unambiguously. However, the number of positive charges is at least 1 and not more than n, where n is the total number of all the recurring units (identical or different) within the polythiophene.

To compensate the positive charge, if this is not already done by the optionally sulfonate- or carboxylate-substituted and therefore negatively charged radicals R, the cationic polythiophenes require anions as counter-anions.

Counter-ions can be monomeric or polymeric anions, the latter also being called polyanions in the following.

Polymeric anions for use in the solid electrolyte can be, for example, anions of polymeric carboxylic acids, such as polyacrylic acids, polymethacrylic acids or polymaleic acids, or polymeric sulfonic acids, such as polystyrenesulfonic acids and polyvinylsulfonic acids. These polycarboxylic and -sulfonic acids can also be copolymers of vinylcarboxylic and vinylsulfonic acids with other polymerizable monomers, such as acrylic acid esters and styrene.

Monomeric anions are preferably employed for the solid electrolyte, since these penetrate better into the oxidized electrode body.

Anions which serve as monomeric anions are, for example, those of $C_1$-$C_{20}$-alkanesulfonic acids, such as methane-, ethane-, propane-, butane- or higher sulfonic acids, such as dodecanesulfonic acid, of aliphatic perfluorosulfonic acids, such as trifluoromethanesulfonic acid, perfluorobutanesulfonic acid or perfluorooctanesulfonic, of aliphatic $C_1$-$C_{20}$-carboxylic acids, such as 2-ethylhexylcarboxylic acid, of aliphatic perfluorocarboxylic acids, such as trifluoroacetic acid or perfluorooctanoic acid, and of aromatic sulfonic acids optionally substituted by $C_1$-$C_{20}$-alkyl groups, such as benzenesulfonic acid, o-toluenesulfonic acid, p-toluenesulfonic acid or dodecylbenzenesulfonic acid, and of cycloalkanesulfonic acids, such as camphorsulfonic acid, or tetrafluoroborates, hexafluorophosphates, perchlorates, hexafluoroantimonates, hexafluoroarsenates or hexachloroantimonates.

The anions of p-toluenesulfonic acid, methanesulfonic acid or carnphorsulfonic acid are preferred.

Cationic polythiophenes which contain anions as counter-ions for charge compensation are often also called polythiophene/(poly)anion complexes by persons skilled in the art.

In addition to the conductive polymers and optionally also counter-ions, the solid electrolyte can comprise binders, crosslinking agents, surface-active substances, such as e.g. ionic or nonionic surfactants or adhesion promoters, and/or further additives.

Adhesion promoters are, for example, organofunctional silanes or hydrolysates thereof, e.g. 3-glycidoxypropyltrialkoxysilane, 3-aminopropyltriethoxysilane, 3-mercaptopropyltrimethoxysilane, 3-methacryloxypropyltrimethoxysilane, vinyltri-methoxysilane or octyltriethoxysilane.

The solid electrolyte preferably comprises the conductive polymer and monomeric anions as counter-ions.

The solid electrolyte preferably forms a layer having a thickness of less than 200 nm, particularly preferably less than 100 nm, very particularly preferably less than 50 nm on the dielectric surface.

The covering of the dielectric with the solid electrolyte can be determined as follows: The capacitance of the capacitor is measured at 120 Hz in the dry and wet state. The degree of covering is the ratio of the capacitance in the dry state to the capacitance in the wet state, expressed in percent. Dry state means that the capacitor has been dried at elevated temperature (80-120° C.) for several hours before it is measured. Wet state means that the capacitor is exposed to a saturated atmospheric humidity under elevated pressure, for example in a steam pressure boiler, for several hours. During this procedure the moisture penetrates into pores which are not covered by the solid electrolyte and acts as a liquid electrolyte there.

The covering of the dielectric by the solid electrolyte is preferably greater than 50%, particularly preferably greater than 70%, very particularly preferably greater than 80%.

Figure 2:
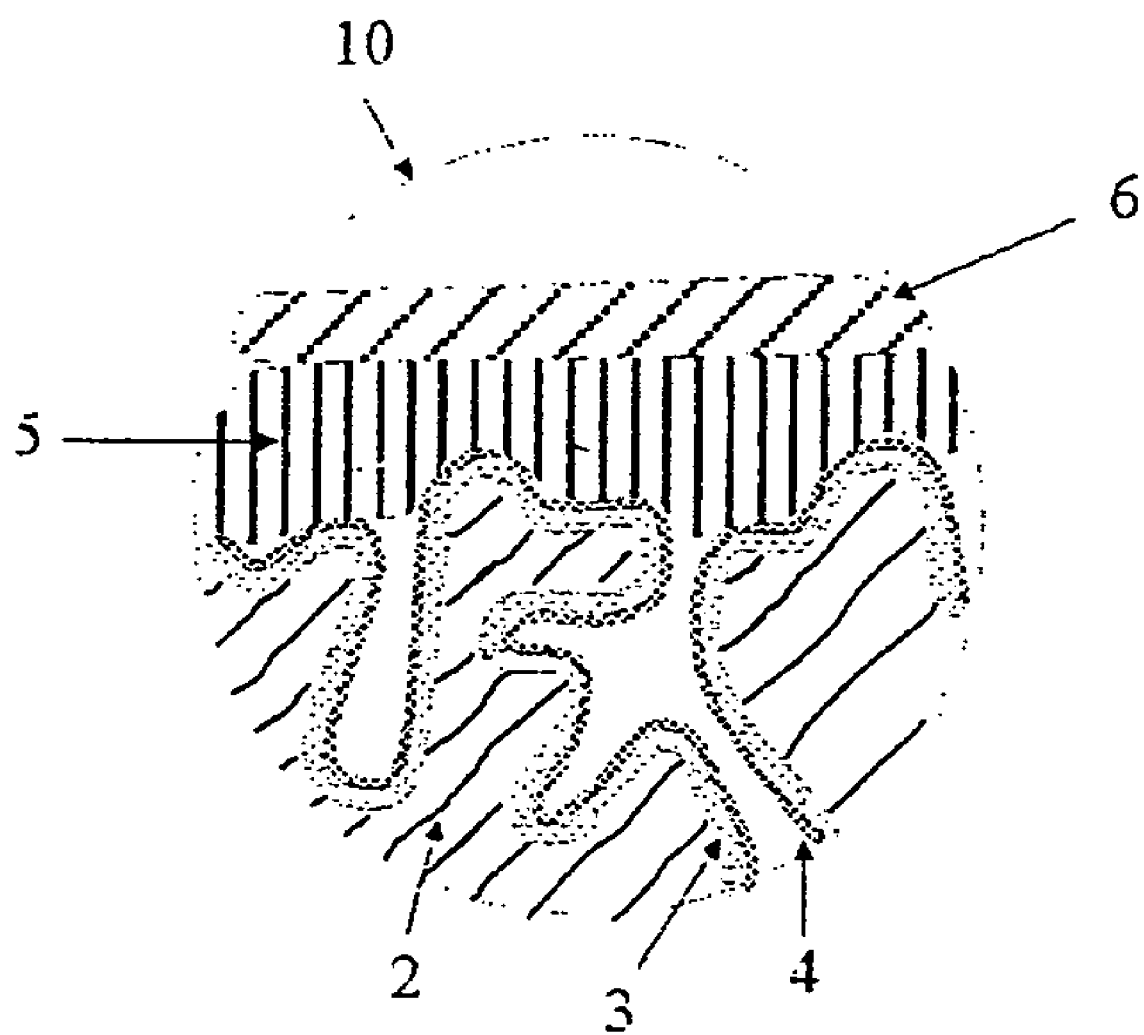
FIG. 2 is the enlarged diagram detail 10 from FIG. 1 and represents the diagrammatic layer construction of the capacitor.

The polymeric outer layer is preferably, as shown diagrammatically and by way of example in FIG. 1 and FIG. 2, on the entire or a part of the outer surface of the capacitor body. Outer surface is understood as meaning the outer surfaces of the capacitor body.

FIG. 1 describes a diagrammatic representation of the construction of a solid electrolyte capacitor by the example of a tantalum capacitor comprising

| | |
|---|---|
| 1 | capacitor body |
| 5 | polymeric outer layer |
| 6 | graphite/silver layer |
| 7 | wire contact to the electrode body 2 |
| 8 | outer contacts |
| 9 | encapsulation |
| 10 | diagram detail |

FIG. 2 describes the enlarged diagram detail 10 from FIG. 1 which represents the diagrammatic layer construction of the tantalum capacitor comprising

| | |
|---|---|
| 10 | diagram detail |
| 2 | porous electrode body (anode) |
| 3 | dielectric |
| 4 | solid electrolyte |
| 5 | polymeric outer layer |
| 6 | graphite/silver layer |

Geometric surface area in the following is understood as meaning the outer area of the capacitor body 1 which results from the geometric dimensions. For rectangular parallelepipedal sintered bodies the geometric surface area is accordingly:

geometric surface area=$2(L*B+L*H+B*H)$, wherein L is the length, B is the breadth and H is the height of the body and * stands for the multiplication symbol. In this context, only the part of the capacitor body 1 on which the polymeric outer layer is present is considered.

If several capacitor bodies 1 are used in one capacitor, the individual geometric surface areas are added together to give a total geometric surface area.

For solid electrolyte capacitors which have, for example, a wound film as the porous electrode body, the dimensions of the unwound film (length, breadth) are used as the measurements.

Instead of solid electrolytes comprising a conductive polymer, the solid electrolyte capacitors can also comprise solid electrolytes comprising a non-polymeric conductive material, such as, for example, charge transfer complexes, such as e.g. TCNQ (7,7,8,8-tetracyano-1,4-quinodimethane), manganese dioxide or salts, such as e.g. those which can form ionic liquids. The polymeric outer layer also leads to lower residual currents in such solid electrolyte capacitors.

For the polythiophenes of the particles b) of the electrically conductive polymer having recurring units of the general formula (I), (II) or recurring units of the general formula (I) and (II) which are in the dispersion a), the same preferred structural features as for the polythiophenes in the solid electrolyte apply.

Polymeric or monomeric anions can function as the counter-ion for the polyanilines and/or the polythiophenes of the said particles b) having recurring units of the general formula (I), (II) or recurring units of the general formula (I) and (II) in the dispersion a). Preferably, however, polymeric anions serve as counter-ions in the dispersion a).

Polymeric anions here can be, for example, anions of polymeric carboxylic acids, such as polyacrylic acids, polymethacrylic acids or polymaleic acids, or polymeric sulfonic acids, such as polystyrenesulfonic acids and polyvinylsulfonic acids. These polycarboxylic and -sulfonic acids can also be copolymers of vinylcarboxylic and vinylsulfonic acids with other polymerizable monomers, such as acrylic acid esters and styrene.

An anion of a polymeric carboxylic or sulfonic acid is preferred as the polymeric anion in the particles b) mentioned.

The anion of polystyrenesulfonic acid (PSS) is particularly preferred as the polymeric anion.

The molecular weight of the polyacids which supply the polyanions is preferably 1,000 to 2,000,000, particularly preferably 2,000 to 500,000. The polyacids or their alkali metal salts are commercially obtainable, e.g. polystyrenesulfonic acids and polyacrylic acids, or can be prepared by known processes (see e.g. Houben Weyl, Methoden der organischen Chemie, vol. E 20 Makromolekulare Stoffe, part 2, (1987), p. 1141 et seq.).

The dispersion a) can comprise the polymeric anion(s) and electrically conductive polymers in particular in a weight ratio of from 0.5:1 to 50:1, preferably from 1:1 to 30:1, particularly preferably 2:1 to 20:1. The weight of the electrically conductive polymers corresponds here to the weight of the monomers employed, assuming that complete conversion takes place during the polymerization.

The dispersion a) can also comprise monomeric anions. For the monomeric anions, the same preferred anions as listed above for the solid electrolyte apply.

The dispersion a) can moreover comprise further components, such as surface-active substances, e.g. ionic and nonionic surfactants or adhesion promoters, such as e.g. organofunctional silanes or hydrolysates thereof, e.g. 3-glycidoxypropyltrialkoxysilane, 3-aminopropyltriethoxysilane, 3-mercaptopropyl-trimethoxysilane, 3-methacryloxypropyl-trimethoxysilane, vinyltrimethoxysilane or octyltriethoxysilane.

The thickness of the polymeric outer layer is preferably 1-1,000 μm, particularly preferably 1-100 μm, very particularly preferably 2-50 μm, especially particularly preferably 4-20 μm. The layer thickness can vary on the outer surface. In particular, the layer thickness at the edges of the capacitor body can be thicker or thinner than on the side faces of the capacitor body. However, a virtually homogeneous layer thickness is preferred.

The polymeric outer layer can have a homogeneous or inhomogeneous distribution with regard to its composition in respect of the binders c) and conductive polymers. Homogeneous distributions are preferred.

The polymeric outer layer can be a constituent of a multi-layer system which forms the outer layer of the capacitor body. Thus, there can be one or more further functional layers (e.g. adhesion promoter layers) between the solid electrolyte and the polymeric outer layer. However, the electrical function of the polymeric outer layer should not be impaired as a result. There can also be further functional layers on the polymeric outer layer. Furthermore, there can be several polymeric outer layers on the capacitor body.

Preferably, the polymeric outer layer is directly on the solid electrolyte. The polymeric outer layer preferably penetrates into the edge region of the capacitor body, in order to achieve a good electrical contact to the solid electrolyte and to increase the adhesion to the capacitor body, but not into the entire depth of all the pores (cf. FIG. 2 by way of example).

In a particularly preferred embodiment, the electrolyte capacitor produced by the novel process comprises a solid electrolyte comprising poly(3,4-ethylenedioxythiophene) (PEDT) and a polymeric outer layer comprising polystyrenesulfonic acid (PSS) and poly(3,4-ethylenedioxythiophene), the latter often also being called PEDT/PSS or PEDOT/PSS in the literature.

In a very particularly preferred embodiment, the electrolyte capacitor produced by the novel process comprises a solid electrolyte of poly(3,4-ethylenedioxythiophene) and monomeric counter-ions and a polymeric outer layer of PEDT/PSS and a binder c).

A process for the production of electrolyte capacitors, characterized in that the electrode material is a valve metal or a compound having electrical properties comparable to a valve metal, is furthermore preferred.

In the context of the invention, valve metal is to be understood as meaning those metals of which the oxide layers do not render current flow equally possible in both directions: if a voltage is applied to the anode, the oxide layers of the valve metals block the current flow, while if a voltage is applied to the cathode, high currents occur, which can destroy the oxide layer. The valve metals include Be, Mg, Al, Ge, Si, Sn, Sb, Bi, Ti, Zr, Hf, V, Nb, Ta and W as well as an alloy or compound of at least one of these metals with other elements. The best-known representatives of the valve metals are Al, Ta and Nb. Compounds having electrically properties comparable to a valve metal are those with metallic conductivity which can be oxidized and the oxide layers of which have the properties described above. For example, NbO has metallic conductivity, but in general is not regarded as a valve metal. However, layers of oxidized NbO have the typical properties of valve metal oxide layers, so that NbO or an alloy or compound of NbO with other elements are typical examples of such compounds having electrical properties comparable to a valve metal.

Accordingly, the term "oxidizable metal" means not only metals but also an alloy or compound of a metal with other elements, as long as they have metallic conductivity and are oxidizable.

The present invention accordingly particularly preferably provides a process for the production of electrolyte capacitors, characterized in that the valve metal or the compound having electrical properties comparable to a valve metal is tantalum, niobium, aluminium, titanium, zirconium, hafnium, vanadium, an alloy or compound of at least one of these metals with other elements, NbO or an alloy or compound of NbO with other elements.

The dielectric preferably comprises an oxide of the electrode material. It optionally comprises further elements and/or compounds.

The capacitance of the oxidized electrode body depends on the surface area and the thickness of the dielectric, as well as on the nature of the dielectric. The specific charge is a measure of how much charge per unit weight the oxidized electrode body can accommodate. The specific charge is calculated as follows:

Specific charge=(capacitance*voltage)/weight of the oxidized electrode body.

The capacitance is obtained from the capacitance of the finished capacitor measured at 120 Hz and the voltage is the operating voltage of the capacitor (rated voltage). The weight of the oxidized electrode body relates to the pure weight of the porous electrode material covered with dielectric, without polymer, contacts and encapsulations.

Preferably, the electrolyte capacitors produced by the novel process have a specific charge of greater than 10,000 µC/g, particularly preferably greater than 20,000 µC/g, very particularly preferably greater than 30,000 µC/g, extremely preferably greater than 40,000 µC/g.

The solid electrolyte capacitor produced by the process according to the invention is distinguished by a low residual current and low equivalent series resistance. Since the polymeric outer layer forms a dense layer around the capacitor body and the edges thereof are covered very well, the capacitor body is robust towards mechanical stresses. Furthermore, the polymeric outer layer shows a good adhesion to the capacitor body and a high electrical conductivity, so that low equivalent series resistances can be achieved.

The present invention preferably provides electrolyte capacitors produced by the novel process which have an ESR, measured at 100 kHz, of less than 50 m$\Omega$. The ESR of the electrolyte capacitors produced by the novel process, measured at a frequency of 100 kHz, is particularly preferably less than 31 m$\Omega$, very particularly preferably less than 21 m$\Omega$, extremely preferably less than 16 m$\Omega$. In particularly preferred embodiments of the electrolyte capacitors, the ESR is less than 11 m$\Omega$.

The equivalent series resistance of a solid electrolyte capacitor correlates inversely with the geometric surface area of the capacitor. The product of the equivalent series resistance and the geometric surface area accordingly gives a parameter which is independent of the structural size.

The present invention therefore also preferably provides electrolyte capacitors produced by the novel process in which the product of the equivalent series resistance, measured at 100 kHz, and the geometric surface area of the capacitor body is less than 4,000 m$\Omega$mm$^2$. The product of the equivalent series resistance and the geometric surface area is particularly preferably less than 3,000 m$\Omega$mm$^2$, very particularly preferably less than 2,000 m$\Omega$mm$^2$, extremely preferably less than 1,000 m$\Omega$mm$^2$. In particularly preferred embodiments of the electrolyte capacitors, the product of the equivalent series resistance and the geometric surface area is less than 600 m$\Omega$mm$^2$.

In principle, such an electrolyte capacitor according to the invention can be produced as follows: Firstly e.g. a valve metal powder having a high surface area is pressed and sintered to give a porous electrode body. In this procedure, an electrical contact wire of the same metal of the powder, e.g. tantalum, is conventionally also pressed into the electrode body. Alternatively, metal films can also be etched in order to obtain a porous film.

The electrode body is then covered, for example by electrochemical oxidation, with a dielectric, i.e. an oxide layer. A conductive polymer, which forms the solid electrolyte, is then deposited chemically or electrochemically on the dielectric, e.g. by means of oxidative polymerization. For this, precursors for the preparation of conductive polymers, one or more oxidizing agents and optionally counter-ions are applied, together or successively, to the dielectric of the porous electrode body and subjected to chemical oxidative polymerization, or precursors for the preparation of conductive polymers and counter-ions are polymerized on the dielectric of the porous electrode body by electrochemical polymerization. Thereafter, according to the invention, a layer comprising at least one optionally substituted polyaniline and/or one polythiophene having recurring units of the general formula (I), (II) or recurring units of the general formula (I) and (II) and at least one binder c) is applied to the capacitor body from a dispersion a). Further layers are optionally applied to the polymeric outer layer. A covering with layers of good conductivity, such as graphite and silver, or a metallic cathode body serves as the electrode for conducting away the current. Finally, the capacitor is contacted and encapsulated.

Precursors for the preparation of conductive polymers of the solid electrolyte, also called precursors in the following, are understood as meaning corresponding monomers or derivatives thereof. Mixture of various precursors can also be used. Suitable monomeric precursors are, for example, optionally substituted thiophenes, pyrroles or anilines, preferably optionally substituted thiophenes, particularly preferably optionally substituted 3,4-alkylenedioxythiophenes.

Substituted 3,4-alkylenedioxythiophenes which may be mentioned by way of example are the compounds of the general formula (III), (IV) or a mixture of thiophenes of the general formulae (III) and (IV)

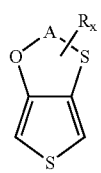

(III)

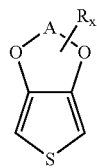

(IV)

wherein

A represents an optionally substituted $C_1$-$C_5$-alkylene radical, preferably an optionally substituted $C_2$-$C_3$-alkylene radical, R represents a linear or branched, optionally substituted $C_1$-$C_{18}$-alkyl radical, preferably linear or branched, optionally substituted $C_1$-$C_4$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical, preferably optionally substituted $C_1$-$C_2$-hydroxyalkyl radical, or a hydroxyl radical, x represents an integer from 0 to 8, preferably from 0 to 6, particularly preferably 0 or 1 and in the case where several radicals R are bonded to A, these can be identical or different.

Optionally substituted 3,4-ethylenedioxythiophenes are very particularly preferred monomeric precursors.

Substituted 3,4-ethylenedioxythiophenes which may be mentioned by way of example are the compounds of the general formula (V)

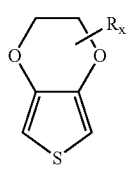

(V)

wherein

R and x have the meaning given for the general formulae (III) and (IV).

In the context of the invention, derivatives of these monomeric precursors are understood as meaning, for example, dimers or trimers of these monomeric precursors. Higher molecular weight derivatives, i.e. tetramers, pentamers etc., of the monomeric precursors are also possible derivatives.

Derivatives of substituted 3,4-alkylenedioxythiophenes which may be mentioned by way of example are the compounds of the general formula (VI)

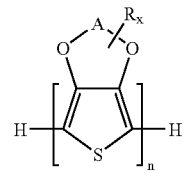

(VI)

wherein n represents an integer from 2 to 20, preferably 2 to 6, particularly preferably 2 or 3 and

A, R and x have the meaning given for the general formulae (III) and (IV).

The derivatives can be built up from either identical or different monomer units and can be employed in the pure form and in a mixture with one another and/or with the monomeric precursors. Oxidized or reduced forms of these precursors are also included by the term "precursors" in the context of the invention, as long as the same conductive polymers are formed during their polymerization as in the case of the precursors listed above.

In the context of the invention, $C_1$-$C_5$-alkylene radicals A are methylene, ethylene, n-propylene, n-butylene or n-pentylene. In the context of the invention, $C_1$-$C_{18}$-alkyl radicals R represent linear or branched $C_1$-$C_{18}$-alkyl radicals, such as, for example, methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl radicals R represent, for example, cyclopentyl, cyclohexyl, cycloheptyl, cyclooctyl, cyclononyl or cyclodecyl, $C_5$-$C_{14}$-aryl radicals R represent, for example, phenyl or naphthyl, and $C_7$-$C_{18}$-aralkyl radicals R represent, for example, benzyl, o-, m-, p-tolyl, 2,3-, 2,4-, 2,5-, 2,6-, 3,4-, 3,5-xylyl or mesityl. The above list serves to illustrate the invention by way of example and is not to be considered as conclusive.

Possible optionally further substituents of the radicals A and/or of the radicals R are numerous organic groups, for example alkyl, cycloalkyl, aryl, aralkyl, alkoxy, halogen, ether, thioether, disulfide, sulfoxide, sulfone, sulfonate, amino, aldehyde, keto, carboxylic acid ester, carboxylic acid, carbonate, carboxylate, cyano, alkylsilane and alkoxysilane groups as well as carboxamide groups.

Possible substituents for the abovementioned precursors, in particular for the thiophenes, preferably for the 3,4-alkylenedioxythiophenes, are the radicals mentioned for R for the general formulae (III) and (IV).

Possible substituents for pyrroles and anilines are, for example, the abovementioned radicals A and R and/or the further substituents of the radicals A and R.

Processes for the preparation of the monomeric precursors for the preparation of conductive polymers and derivatives thereof are known to the person skilled in the art and are described, for example, in L. Groenendaal, F. Jonas, D. Freitag, H. Pielartzik & J. R. Reynolds, Adv. Mater. 12 (2000) 481-494 and literature cited therein.

The 3,4-alkylenoxythiathiophenes of the formula (III) required for the preparation of the polythiophenes to be used are known to the person skilled in the art or can be prepared by known processes (for example in accordance with P. Blanchard, A. Cappon, E. Levillain, Y. Nicolas, P. Frère and J. Roncali, Org. Lett. 4 (4), 2002, p. 607-609).

The conductive polymers are preferably produced, on the electrode body covered with dielectric, by oxidative polymerization of precursors for the preparation of conductive polymers by a procedure in which the precursors, oxidizing agent and optionally counter-ions, preferably in the form of solutions, are applied to the dielectric of the electrode body either separately in succession or together and the oxidative polymerization is brought to completion, optionally by heating the coating, depending on the activity of the oxidizing agent used.

The application can take place on the dielectric of the electrode body directly or using an adhesion promoter, for example a silane, such a e.g. organofunctional silanes or hydrolysates thereof, e.g. 3-glycidoxypropyltrialkoxysilane, 3-aminopropyltriethoxysilane, 3-mercaptopropyltrimethoxysilane, 3-methacryloxypropyltrimethoxysilane, vinyltrimethoxysilane or octyltriethoxysilane, and/or one or more other functional layers.

The oxidative chemical polymerization of the thiophenes of the formula(e) (III) or (IV) is in general carried out at temperatures of from $-10°$ C. to $250°$ C., preferably at temperatures of from $0°$ C. to $200°$ C., depending on the oxidizing agent used and the desired reaction time.

Solvents which may be mentioned for the precursors for the preparation of conductive polymers and/or oxidizing agents and/or counter-ions are above all the following organic solvents which are inert under the reaction conditions: aliphatic alcohols, such as methanol, ethanol, i-propanol and butanol; aliphatic ketones, such as acetone and methyl ethyl ketone; aliphatic carboxylic acid esters, such as ethyl acetate and butyl acetate; aromatic hydrocarbons, such as toluene and xylene; aliphatic hydrocarbons, such as hexane, heptane and cyclohexane; chlorohydrocarbons, such as methylene chloride and dichloroethane; aliphatic nitriles, such as acetonitrile; aliphatic sulfoxides and sulfones, such as dimethylsulfoxide and sulfolane; aliphatic carboxylic acid amides, such as methylacetamide, dimethylacetamide and dimethylformamide; and aliphatic and araliphatic ethers, such as diethyl ether and anisole. Water or a mixture of water with the abovementioned organic solvents can furthermore also be used as the solvent.

Oxidizing agents which can be used are all the metal salts known to the person skilled in the art which are suitable for the oxidative polymerization of thiophenes, anilines or pyrroles.

Suitable metal salts are metal salts of main group or sub-group metals, the latter also being called transition metal salts in the following, of the periodic table of the elements. Suitable transition metal salts are, in particular, salts of an inorganic or organic acid or inorganic acid containing organic radicals with transition metals, such as e.g. with iron(III), copper(II), chromium(VI), cerium(IV), manganese(IV), manganese(VII) and ruthenium(III).

Preferred transition metal salts are those of iron(III). Conventional iron(III) salts are advantageously inexpensive and readily obtainable and can be handled easily, such as e.g. the iron(III) salts of inorganic acids, such as, for example, iron(III) halides (e.g. $FeCl_3$) or iron(III) salts of other inorganic acids, such as $Fe(ClO_4)_3$ or $Fe_2(SO_4)_3$, and the iron(III) salts of organic acids and inorganic acids containing organic radicals.

Examples which may be mentioned of iron(III) salts of inorganic acids containing organic radicals are the iron(III) salts of the sulfuric acid monoesters of $C_1$-$C_{20}$-alkanols, e.g. the iron(III) salt of lauryl sulfate.

Particularly preferred transition metal salts are those of an organic acid, in particular iron(III) salts of organic acids.

Examples which may be mentioned of iron(III) salts of organic acids are: the iron(III) salts of $C_1$-$C_{20}$-alkanesulfonic acids, such as methane-, ethane-, propane-, butane- or higher sulfonic acids, such as dodecanesulfonic acid, of aliphatic perfluorosulfonic acids, such as trifluoromethanesulfonic acid, perfluorobutanesulfonic acid or perfluorooctanesulfonic aicd, of aliphatic $C_1$-$C_{20}$-carboxylic acids, such as 2-ethylhexylcarboxylic acid, of aliphatic perfluorocarboxylic acids, such as trifluoroacetic acid or perfluorooctanoic acid, and of aromatic sulfonic acids optionally substituted by $C_1$-$C_{20}$-alkyl groups, such as benzenesulfonic acid, o-toluenesulfonic acid, p-toluenesulfonic acid or dodecylbenzenesulfonic acid, and of cycloalkanesulfonic acids, such as camphorsulfonic acid.

Any desired mixtures of these abovementioned iron(III) salts of organic acids can also be employed.

The use of the iron(III) salts of organic acids and of inorganic acids containing organic radicals has the great advantage that they do not have a corrosive action.

Iron(III) p-toluenesulfonate, iron(III) o-toluenesulfonate or a mixture of iron(III) p-toluenesulfonate and iron(III) o-toluenesulfonate are very particularly preferred as metal salts.

Oxidizing agents which are furthermore suitable are peroxo compounds, such as peroxodisulfates (persulfates), in particular ammonium and alkali metal peroxodisulfates, such as sodium and potassium peroxodisulfate, or alkali metal perborates—optionally in the presence of catalytic amounts of metal ions, such as iron, cobalt, nickel, molybdenum or vanadium ions—and transition metal oxides, such as e.g. pyrolusite (manganese(IV) oxide) or cerium(IV) oxide.

For oxidative polymerization of the thiophenes of the formula (III) or (IV), theoretically 2.25 equivalents of oxidizing agent are required per mol of thiophene (see e.g. J. Polym. Sc. part A Polymer Chemistry vol. 26, p. 1287 (1988)). However, lower or higher equivalents of oxidizing agent can also be employed. In the context of the invention, preferably one equivalent or more, particularly preferably 2 equivalents or more of oxidizing agent are employed per mol of thiophene.

If the precursors, oxidizing agents and optionally counter-ions are applied separately, the dielectric of the electrode body is preferably initially coated with the solution of the oxidizing agent and optionally the counter-ions and then with the solution of the precursors. In the case of the preferred joint application of precursors, oxidizing agent and optionally counter-ions, the dielectric of the electrode body is coated only with one solution, namely a solution containing precursors, oxidizing agent and optionally counter-ions.

Further components, such as one or more organic binders which are soluble in organic solvents, such as polyvinyl acetate, polycarbonate, polyvinyl butyral, polyacrylic acid esters, polymethacrylic acid esters, polystyrene, polyacrylonitrile, polyvinyl chloride, polybutadiene, polyisoprene, polyethers, polyesters, silicones or styrene/acrylic acid ester, vinyl acetate/acrylic acid ester and ethylene/vinyl acetate copolymers, or water-soluble binders such as polyvinyl alcohols, crosslinking agents, such as melamine compounds, masked isocyanates, functional silanes—e.g. tetraethoxysilane, alkoxysilane hydrolysates, e.g. based on tetraethoxysilane, epoxysilanes, such as 3-glycidoxypropyltrialkoxysilane—polyurethanes, polyacrylates or polyolefin dispersions, and/or additives such as e.g. surface-active substances, e.g. ionic or nonionic surfactants or adhesion promoters, such as e.g. organofunctional silanes and hydrolysates thereof, e.g. 3-glycidoxypropyltrialkoxysilane, 3-aminopropyltriethoxysilane, 3-mercaptopropyl-trimethoxysilane, 3-methacryloxypropyltrimethoxysilane, vinyltrimethoxysilane or octyltriethoxysilane, can moreover be added to the solutions.

The solutions to be applied to the dielectric of the electrode body preferably contain 1 to 30 wt. % of the thiophene of the general formula (III) or of the mixture of thiophenes of the general formulae (III) and (IV) and 0 to 50 wt. % of binder, crosslinking agent and/or additives, both percentages by weight being based on the total weight of the mixture.

The solutions are applied to the dielectric of the electrode body by known processes, e.g. by impregnation, pouring, dripping on, spraying atomizing on, knife-coating on, brushing, spincoating or printing, for example ink-jet, screen, contact or tampon printing.

The removal of the solvents after application of the solutions can be carried out by simple evaporation at room temperature. However, to achieve higher processing speeds it is more advantageous to remove the solvents at elevated temperatures, e.g. at temperatures of from 20 to 300° C., preferably 40 to 250° C. A thermal after-treatment can be combined directly with the removal of the solvents, or can be carried out at a time removed from the production of the coating.

The duration of the heat treatment is 5 seconds to several hours, depending on the nature of the polymer used for the coating. Temperature profiles with different temperatures and dwell times can also be employed for the thermal treatment.

The heat treatment can be carried out e.g. by a procedure in which the coated oxidized electrode body is moved though a heating chamber, which is at the desired temperature, at a speed such that the desired dwell time at the chosen temperature is achieved, or is brought into contact for the desired dwell time with a hot-plate which is at the desired temperature. Furthermore, the heat treatment can be carried out, for example, in a heating oven or several heating ovens each with different temperatures.

After the removal of the solvents (drying) and, where appropriate, after the thermal after-treatment, it may be advantageous to wash the excess oxidizing agent and residual salts out of the coating with a suitable solvent, preferably water or alcohols. Residual salts here are to be understood as meaning the salts of the reduced form of the oxidizing agent and, where appropriate, further salts present.

For metal oxide dielectrics, such as, for example, the oxides of the valve metals, after the polymerization and preferably during or after the washing it may be advantageous to re-form the oxide film electrochemically, in order to repair any defects in the oxide film and thereby to lower the residual current of the finished capacitor. During this so-called re-forming, the capacitor body is dipped into an electrolyte and a positive voltage is applied to the electrode body. The current which flows re-forms the oxide at defects in the oxide film or destroyed conductive polymer at defects over which a high current flows.

Depending on the nature of the oxidized electrode body, it may be advantageous to impregnate the oxidized electrode body with the mixture further times, preferably after a washing, in order to achieve thicker polymer layers.

The polythiophenes of the solid electrolyte can also be prepared from the precursors by electrochemical oxidative polymerization.

In the electrochemical polymerization, the electrode body coated with a dielectric can first be coated with a thin layer of a conductive polymer. After application of a voltage to this layer, the layer comprising the conductive polymer grows on this. Other conductive layers can also be used as the deposition layer. Thus, Y. Kudoh et al. in Journal of Power Sources 60 (1996) 157-163 describe the use of a deposition layer of manganese oxide.

The electrochemical oxidative polymerization of the precursors can be carried out at temperatures of from $-78°$ C. up to the boiling point of the solvent employed. The electrochemical polymerization is preferably carried out at temperatures of from $-78°$ C. to $250°$ C., particularly preferably from $-20°$ C. to $60°$ C.

The reaction time is 1 minute to 24 hours, depending on the precursor used, the electrolyte used, the temperature chosen and the current density applied.

If the precursors are liquid, the electropolymerization can be carried out in the presence or absence of solvents which are inert under the conditions of the electropolymerization; the electropolymerization of solid precursors is carried out in the presence of solvents which are inert under the conditions of the electrochemical polymerization. In certain cases it may be advantageous to employ solvent mixtures and/or to add solubilizing agents (detergents) to the solvents.

Examples which may be mentioned of solvents which are inert under the conditions of the electropolymerization are: water; alcohols, such as methanol and ethanol; ketones, such as acetophenone; halogenated hydrocarbons, such as methylene chloride, chloroform, carbon tetrachloride and fluorohydrocarbons; esters, such as ethyl acetate and butyl acetate; carbonic acid esters, such as propylene carbonate; aromatic hydrocarbons, such as benzene, toluene and xylene; aliphatic hydrocarbons, such as pentane, hexane, heptane and cyclohexane; nitriles, such as acetonitrile and benzonitrile; sulfoxides, such as dimethylsulfoxide; sulfones, such as dimethyl sulfone, phenyl methyl sulfone and sulfolane; liquid aliphatic amides, such as methylacetamide, dimethylacetamide, dimethylformamide, pyrrolidone, N-methylpyrrolidone and N-methylcaprolactam; aliphatic and mixed aliphatic-aromatic ethers, such as diethyl ether and anisole; and liquid ureas, such as tetramethylurea or N,N-dimethyl-imidazolidinone.

For the electropolymerization, electrolyte additions are added to the precursors or solutions thereof. Electrolyte additions which are preferably used are free acids or conventional conductive salts which have a certain solubility in the solvents used. Electrolyte additions which have proved suitable are e.g.: free acids, such as p-toluenesulfonic acid and methanesulfonic acid, and furthermore salts with alkanesulfonate, aromatic sulfonate, tetrafluoroborate, hexafluorophosphate, perchlorate, hexafluoroantimonate, hexafluoroarsenate and hexachloroantimonate anions and alkali metal, alkaline earth metal or optionally alkylated ammonium, phosphonium, sulfonium and oxonium cations.

The concentrations of the precursors can be between 0.01 and 100 wt. % (100 wt. % only in the case of liquid precursor); the concentrations are preferably 0.1 to 20 wt. %.

The electropolymerization can be carried out discontinuously or continuously.

The current densities for the electropolymerization can vary within wide limits; current densities of from 0.0001 to 100 mA/cm$^2$, preferably 0.01 to 40 mA/cm$^2$, are conventionally used. Voltages of from about 0.1 to 50 V are established at these current densities.

For metal oxide dielectrics, it may be advantageous to re-form the oxide film electrochemically after the electrochemical polymerization in order to repair any defects in the oxide film and thereby to lower the residual current of the finished capacitor (re-formation).

Suitable counter-ions are the monomeric or polymeric anions already listed above, preferably those of the monomeric or polymeric alkane- or cycloalkanesulfonic acids or aromatic sulfonic acids. The anions of the monomeric alkane- or cycloalkanesulfonic acids or aromatic sulfonic acids are particularly preferred for use in the electrolyte capacitors according to the invention, since solutions containing these are more suitable for penetrating into the porous electrode material coated with a dielectric, and a larger contact area can thus be formed between this and the solid electrolyte. The counter-ions are added to the solutions, for example, in the form of their alkali metal salts or as free acids. In the case of electrochemical polymerization, these counter-ions are optionally added to the solution or the thiophenes as electrolyte additions or conductive salts.

The anions which may be present in the oxidizing agent used can moreover serve as counter-ions, so that in the case of chemical oxidative polymerization, an addition of additional counter-ions is not absolutely necessary.

After preparation of the solid electrolyte, the polymeric outer layer is applied as described above.

The addition of binders c) to the dispersion a) has the great advantage that the adhesion of the outer polymer layer to the capacitor body is increased. Furthermore, the binder c) increases the solids content in the dispersion, so that an adequate outer layer thickness can already be achieved with one impregnation and the covering of the edges is improved significantly.

The dispersions a) can moreover comprise crosslinking agents, surface-active substances, such as e.g. ionic or nonionic surfactants or adhesion promoters, and/or additives. Crosslinking agents, surface active substances and/or additives which can be used are those listed above for the solid electrolytes.

The dispersions a) preferably comprise further additives which increase the conductivity, such as e.g. compounds containing ether groups, such as e.g. tetrahydrofuran, compounds containing lactone groups, such as γ-butyrolactone and γ-valerolactone, compounds containing amide or lactam groups, such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone and pyrrolidone, sulfones and sulfoxides, such as e.g. sulfolane (tetramethylene sulfone) and dimethylsulfoxide (DMSO), sugars or sugar derivatives, such as e.g. sucrose, glucose, fructose and lactose, sugar alcohols, such as e.g. sorbitol and mannitol, furan derivatives, such as e.g. 2-furancarboxylic acid and 3-furancarboxylic acid, and/or di- or polyalcohols, such as e.g. ethylene glycol, glycerol, di- and triethylene glycol. Tetrahydrofuran, N-methylformamide, N-methylpyrrolidone, ethylene glycol, dimethylsulfoxide or sorbitol are particularly preferably employed as conductivity-increasing additives.

The dispersions a) can have a pH of 1-14, and a pH of 1-8 is preferred. For corrosion-sensitive dielectrics, such as, for example, aluminium oxides, dispersions having a pH of 4-8 are preferred, in order not to damage the dielectric.

The dispersions are prepared from optionally substituted anilines, thiophenes of the general formula (III), (IV) or mixtures of thiophenes of the general formula (III) and (IV), for example, analogously to the conditions mentioned in EP-A 440 957 (U.S. Pat. No. 5,300,575). Possible oxidizing agents and solvents are those already listed above. The diameter distribution of the particles b) can be adjusted, for example, via a high pressure homogenization.

A preparation of the polyaniline/polyanion or polythiophene/polyanion complex and subsequent dispersing or redispersing in one or more solvent(s) is also possible.

The dispersions a) are applied to the capacitor body by known processes, e.g. by spincoating, impregnation, pouring, dripping on, spraying, atomizing on, knife-coating on, brushing or printing, for example ink-jet, screen or tampon printing.

The viscosity of the dispersion a) can be between 0.1 and 100,000 mPa·s (measured at a shear rate of 100 s$^{-1}$), depending on the application method. Preferably, the viscosity is 1 to 10,000 mPa·s, particularly preferably between 10 to 1,000 mPa·s, very particularly preferably 30-500 mPa·s.

In the case of application of the dispersion a) to the capacitor body by means of impregnation, it may be advantageous to allow a thin film of higher viscosity to form on the surface of the dispersion a) before the impregnation. If the capacitor body is then dipped successively deeper into such a dispersion a) in one or more impregnation and drying cycles, the covering of the edges and corners of the capacitor body is improved significantly and bubble formation in the dry polymer film is suppressed. It is thus possible for only half of the capacitor body, for example, to be impregnated in the dispersion a) in the first step and then to be dried. In a second impregnating step, the capacitor body can then be dipped completely into the dispersion a) and subsequently dried. The formation of the thin film of higher viscosity on the surface of the dispersion a) can be achieved, for example, by simply allowing it to stand in the open atmosphere. The film formation can be accelerated e.g. by heating the dispersion a) or by heating the dispersion surface with hot air or radiant heat.

Preferably, dispersions a) which have a specific conductivity in the dried state of greater than 10 S/cm, particularly preferably greater than 20 S/cm, very particularly preferably greater than 50 S/cm and extremely preferably greater than 100 S/cm are employed.

The application of the polymeric outer layer can also be followed by drying, cleaning of the layer by washing, re-forming and application several times—as already described above for the preparation of the solid electrolyte. The dispersing agent d) is preferably removed during a drying. However, at least some of the dispersing agent d) can also remain in the polymeric outer layer. Further treatment steps, such as e.g. curing or crosslinking by heat or light, can also be applied, depending on the binder c) or crosslinking agent used. Moreover, further layers can be applied to the polymeric outer layer.

It has been found, surprisingly, that for metal oxide dielectrics, after application and drying of the dispersion a) no further treatment steps are necessary on the layer in order to produce solid electrolyte capacitors having a low ESR and low residual current. In other processes for the preparation of a polymeric outer layer, the oxide layer conventionally has to be re-formed after application of the conductive polymeric outer layer, in order to achieve low residual currents. The polymeric outer layer may become detached locally from the capacitor body by this re-forming in an electrolyte, as a result of which the ESR is increased. If the process according to the invention is used, the re-forming can be dispensed with without the residual current thereby increasing.

After preparation of the polymeric outer layer, further layers of good conductivity, such as, for example, graphite and/or silver layers, are preferably optionally applied to the capacitor and the capacitor is contacted and encapsulated.

The valve metals or compounds having comparable electrical properties listed above for the electrolyte capacitor are preferably used for the production of the electrode body. Preferred ranges apply accordingly.

The oxidizable metals are sintered, for example, in powder form to give a porous electrode body, or a porous structure is impressed on a metallic body. The latter can be carried out e.g. by etching of a film.

The porous electrode bodies are oxidized, for example, in a suitable electrolyte, such as e.g. phosphoric acid, by application of a voltage. The level of this forming voltage depends on the oxide layer thickness to be achieved or the later use voltage of the capacitor. Preferred voltages are 1 to 300 V, particularly preferably 1 to 80 V.

Preferably, metal powders having a specific charge of greater than 35,000 µC/g, particularly preferably having a specific charge of greater than 45,000 µC/g, very particularly preferably having a specific charge of greater than 65,000 µC/g, extremely preferably having a specific charge of greater than 95,000 µC/g, are used for the preparation of the electrode body. In preferred embodiments of the process according to the invention, metal powders having a specific charge of greater than 140,000 µC/g are employed.

In this context, the specific charge is calculated as follows:

Specific charge=(capacitance*voltage)/weight of the oxidized electrode body.

In this context, the capacitance is obtained from the capacitance of the oxidized electrode body, measured at 120 Hz, in an aqueous electrolyte. The electrical conductivity of the electrolyte here is sufficiently high for a drop in capacitance due to the electrical resistance of the electrolyte not yet to occur at 120 Hz. For example, 18% strength aqueous sulfuric acid electrolyte is employed for the measurement. The voltage in the above formula corresponds to the maximum forming voltage (oxidation voltage).

Solid electrolyte capacitors having a dense polymeric outer layer which have good covering of the edges and adhesion can be produced in a particularly simple manner with the process according to the invention. At the same time, the capacitors are distinguished by low residual currents and a low ESR.

On the basis of their low residual current and their low ESR, the electrolyte capacitors produced according to the invention are outstandingly suitable for use as a component in electronic circuits. The present invention also provides the use. Digital electronic circuits such as exist, for example, in computers (desktop, laptop, server), in portable electronic equipment, such as e.g. mobile telephones and digital cameras, in equipment for entertainment electronics, such as e.g. in CD/DVD players and computer game consoles, in navigation systems and in telecommunications equipment are preferred.

EXAMPLES

Example 1

1. Production of Oxidized Electrode Bodies

Tantalum powder having a specific capacitance of 50,000 µFV/g was pressed, with inclusion of a tantalum wire 7, to pellets 2 and sintered in order to form a porous electrode body 2 having the dimensions of 4.2 mm*3 mm*1.6 mm. The sintered pellets 2 (anode pellets) were anodized in a phosphoric acid electrolyte at 30 V.

2. Chemical In Situ Coating of the Anode Pellets

A solution comprising one part by weight of 3,4-ethylenedioxythiophene (BAYTRON® M, H. C. Starck GmbH) and 20 parts by weight of a 40 wt. % strength ethanolic solution of iron(III) p-toluenesulfonate (BAYTRON® C-E, H. C. Starck GmbH) was prepared.

The solution was used for impregnation of 18 anode pellets 2. The anode pellets 2 were impregnated in this solution and then dried at room temperature (20° C.) for 30 min. Thereafter, they were heat-treated in a drying cabinet at 50° C. for 30 min. The pellets 2 were then washed in a 2 wt. % strength aqueous solution of p-toluene acid for 30 min. The anode pellets 2 were re-formed in a 0.25 wt. % strength aqueous solution of p-toluenesulfonic acid for 30 min, subsequently rinsed in distilled water and dried. The impregnation, drying, heat treatment and re-forming described were carried out a further two more times with the same pellets 2.

3. Preparation of a Dispersion A According to the Invention 868 g of deionized water and 330 g of an aqueous polystyrenesulfonic acid solution having an average molecular weight of 70,000 and a solids content of 3.8 wt. % are initially introduced into a 2 l three-necked flask with a stirrer and internal thermometer. The reaction temperature was kept between 20 and 25° C.

5.1 g 3,4-ethylenedioxythiophene were added, while stirring. The solution was stirred for 30 minutes. 0.03 g iron(III) sulfate and 9.5 g sodium persulfate were then added and the solution was stirred for a further 24 h.

After the reaction had ended, to remove inorganic salts 100 ml of a strongly acid cation exchanger and 250 ml of a weakly basic anion exchanger were added and the solution was stirred for a further 2 h. The ion exchanger was filtered off.

The poly(3,4-ethylenedioxythiophene)/polystyrenesulfonate dispersion obtained had a solids content of 1.2 wt. % and the following particle diameter distribution:

| | |
|---|---|
| d10 | 100 nm |
| d50 | 141 nm |
| d90 | 210 nm |

The diameter of the particles b) of the conductive polymer is based on a weight distribution of the particles b) in the dispersion as a function of the particle diameter. The determination was carried out via an ultracentrifuge measurement.

90 parts of this poly(3,4-ethylenedioxythiophene)/polystyrenesulfonate dispersion, 4 parts of dimethylsulfoxide (DMSO), 4.2 parts of a sulfonated polyester (Eastek® 1200, solids content: 30 wt. % in water, Eastman) and 0.2 part of surfactant (Zonyl® FS 300, Du Pont) were stirred to form a dispersion A according to the invention.

4. Preparation of a Dispersion B with Conductive Particles b) Having an Average Diameter of Less than 70 nm (Comparison)

868 g of deionized water and 330 g of an aqueous polystyrenesulfonic acid solution having an average molecular weight of 70,000 and a solids content of 3.8 wt. % were initially introduced into a 2 l three-necked flask with a stirrer and internal thermometer. The reaction temperature was kept between 20 and 25° C.

5.1 g 3,4-ethylenedioxythiophene were added, while stirring. The solution was stirred for 30 minutes. 0.03 g iron(III) sulfate and 9.5 g sodium persulfate were then added and the solution was stirred for a further 24 h.

After the reaction had ended, to remove inorganic salts 100 ml of a strongly acid cation exchanger and 250 ml of a weakly basic anion exchanger were added and the solution was stirred for a further 2 h. The ion exchanger was filtered off.

The desalinated 2,4-polyethylenedioxythiophene/polystyrenesulfonate dispersion was homogenized with a high pressure homogenizer 4× under 250 bar.

The 3,4-polyethylenedioxythiophene/polystyrenesulfonate dispersion obtained in this way had a solids content of 1.2 wt. % and the following particle diameter distribution:

|     |       |
| --- | ----- |
| d10 | 10 nm |
| d50 | 31 nm |
| d90 | 66 nm |

90 parts of this poly(3,4-ethylenedioxythiophene)/polystyrenesulfonate dispersion, 4 parts of dimethylsulfoxide (DMSO), 4.2 parts of a sulfonated polyester (Eastek® 1200, solids content: 30 wt. % in water, Eastman) and 0.2 part of surfactant (Zonyl® FS 300, Du Pont) were stirred to form a dispersion B.

5. Preparation of a Polymeric Outer Layer

In each case 9 anode pellets 2 were then impregnated in dispersion A according to the invention and a further 9 pellets 2 were impregnated in dispersion B and the pellets were then dried at 120° C. for 10 minutes. The impregnation and drying were repeated once more for all the pellets 2.

After application of the polymeric outer layer 5, the anode pellets were viewed under an optical microscope: The anode pellets 2 according to the invention with the polymeric outer layer 5 based on dispersion A were covered with a dense polymer film over the entire outer surface. The edges and corners also showed a continuous covering of polymer film. The anode pellets 2 with the polymeric outer layer 5 based on dispersion B showed no covering with polymer film in particular at the upper corners and edges of the anode.

Finally, the pellets 2 were covered with a graphite and silver layer.

The 9 capacitors had on average in each case the following electrical residual currents:

|                         | Capacitor from dispersion A | Capacitor from dispersion B |
| ----------------------- | --------------------------- | --------------------------- |
| Residual current in μA  | 0.2                         | 7.7                         |

The residual current was determined with a Keithley 199 multimeter three minutes after application of a 10 V voltage.

Due to better covering with a polymeric outer layer 5, the capacitors produced by the process according to the invention using dispersions comprising particles b) of a conductive polymer having an average diameter of 141 nm show significantly lower residual currents. In the process which is not according to the invention, with dispersion comprising particles b) of a conductive polymer having an average diameter of 31 nm, the graphite and silver layer evidently come into direct contact with the dielectric, so that a high residual current arises.

What is claimed is:

1. Process for the production of an electrolyte capacitor, in which, on to a capacitor body at least comprising
   a porous electrode body of an electrode material,
   a dielectric, which covers the surface of this electrode material,
   a solid electrolyte at least comprising an electrically conductive material which completely or partly covers the dielectric surface,
   is applied a dispersion a) which at least comprises
   particles b) of an electrically conductive polymer which comprise at least one optionally substituted polyaniline and/or one polythiophene having recurring units of the general formula (I) or of the formula (II) or recurring units of the general formulae (I) and (II)

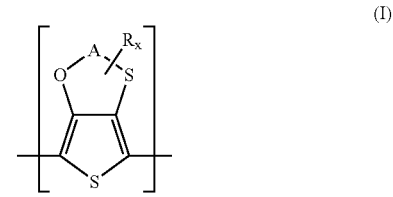

(I)

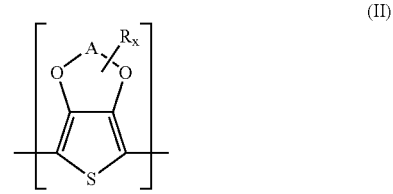

(II)

wherein
   A represents an optionally substituted $C_1$-$C_5$-alkylene radical,
   R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
   x represents an integer from 0 to 8 and
   in the case where several radicals R are bonded to A, these can be identical or different,
   and a binder c) and a dispersing agent d),
   and, for formation of an electrically conductive polymeric outer layer, the dispersing agent d) is at least partly removed and/or the binder c) is cured,
   wherein the particles b) of the conductive polymer in the dispersion a) have an average diameter of 70-500 nm.

2. Process according to claim 1, wherein the $d_{10}$ value of the diameter distribution of the particles b) of the conductive polymer in the dispersion a) is greater than 50 nm and the $d_{90}$ value of the particle diameter distribution is less than 600 nm.

3. Process according to claim 1, wherein the polythiophene in the dispersion a) is poly(3,4-ethylenedioxythiophene).

4. Process according to claim 1, wherein the dispersion a) additionally comprises at least one polymeric anion.

5. Process according to claim 4, wherein the polymeric anion is an anion of a polymeric carboxylic or sulfonic acid.

6. Process according to claim 1, wherein the binder c) contained in the dispersion a) is a polymeric organic binder.

7. Process according to claim 1, wherein the dispersion a) comprises as the dispersion agent d) organic solvents, water or mixtures of these.

8. Process according to claim 1, wherein the dispersion a) additionally comprises crosslinking agents and/or surface-active substances and/or further additives.

9. Process according to claim 8, wherein the dispersion a) comprises as further additives compounds containing ether, lactone, amide or lactam groups, sulfones, sulfoxides, sugars, sugar derivatives, sugar alcohols, furan derivatives and/or di- or polyalcohols.

10. Process according to of claim 1, wherein, in the case of a pH-sensitive dielectric, the dispersion a) is adjusted to a pH of 4-8.

11. Process according to claim 1, wherein the conductive material of the solid electrolyte (4) is a conductive polymer.

12. Process according to claim 11, wherein the conductive polymer contained in the solid electrolyte is a polythiophene, polypyrrole or polyaniline, which are optionally substituted.

13. Process according to claim 12, wherein the conductive polymer contained in the solid electrolyte is a polythiophene having recurring units of the general formula (I) or of the formula (II) or recurring units of the general formulae (I) and (II)

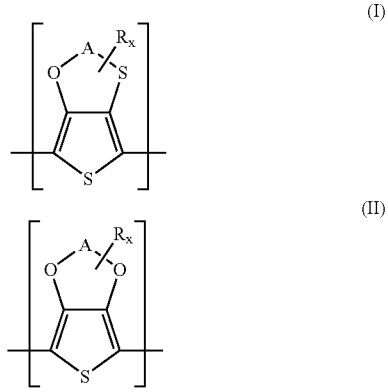

wherein

A represents an optionally substituted $C_1$-$C_5$-alkylene radica,

R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical, x represents an integer from 0 to 8.

14. Process according to claim 13, wherein the conductive polymer contained in the solid electrolyte is poly(3,4-ethylenedioxythiophene).

15. Process according to claim 1, wherein the solid electrolyte comprises monomeric anions.

16. Process according to claim 1, wherein the electrode material of the electrode body is a valve metal or a compound having electrical properties comparable to a valve metal.

17. Process according to claim 16, wherein the valve metal or the compound having electrical properties comparable to a valve metal is tantalum, niobium, aluminium, titanium, zirconium. hafnium, vanadium, an alloy or compound of at least one of these metals with other elements or NbO or an alloy or compound of NbO with other elements.

18. Process according to claim 1, wherein the dielectric is an oxide of the valve metal or an oxide of the compound having electrical properties comparable to a valve metal.

19. Process according to claim 1, wherein after application of the dispersion a) and formation of the electrically conductive polymeric outer layer, the capacitor is optionally provided with further electrically conductive outer contacts (6, 7, 8), optionally contacted and encapsulated.

20. Electrolyte capacitor produced by a process according to claim 1.

21. Electrolyte capacitor according to claim 20, wherein the average layer thickness of the polymeric outer layer is 1-100 μm.

22. Electrolyte capacitor according to claim 20, wherein the electrolyte capacitor has a specific charge of greater than 10,000 μC/g, based on the weight of the electrode body covered with a dielectric.

23. An electronic circuit comprising the electrolyte capacitor according to claim 20.

* * * * *